United States Patent
Ilangovan et al.

(10) Patent No.: US 10,552,289 B2
(45) Date of Patent: Feb. 4, 2020

(54) CORRELATION ANALYSIS OF PERFORMANCE METRICES

(71) Applicant: Tata Consultancy Services Limited, Mumbai (IN)

(72) Inventors: Ramkumar Ilangovan, Chennai (IN); Swarup Chatterjee, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 1120 days.

(21) Appl. No.: 14/214,338

(22) Filed: Mar. 14, 2014

(65) Prior Publication Data
US 2015/0199252 A1 Jul. 16, 2015

(30) Foreign Application Priority Data
Jan. 16, 2014 (IN) ............................ 158/MUM/2014

(51) Int. Cl.
G06F 9/44 (2018.01)
G06F 9/45 (2006.01)
(Continued)

(52) U.S. Cl.
CPC ........ G06F 11/3409 (2013.01); G06F 11/323 (2013.01); G06F 11/3452 (2013.01); G06F 11/3466 (2013.01); G06F 2201/865 (2013.01)

(58) Field of Classification Search
None
See application file for complete search history.

(56) References Cited

U.S. PATENT DOCUMENTS

| 7,559,053 B2 * | 7/2009 | Krassovsky | ........ G06F 11/3409 |
| | | | 714/30 |
| 2004/0267691 A1 * | 12/2004 | Vasudeva | ............ G06F 11/3409 |

(Continued)

FOREIGN PATENT DOCUMENTS

EP  1026592 A2  8/2000

OTHER PUBLICATIONS

Molto' et al., Elastic Memory Management of Virtualized Infrastructures for Applications with Dynamic Memory Requirements, Jun. 2013, Procedia Computer Science, 2013 International Conference on Computational Science, vol. 18, pp. 159-168 (Year: 2013).*

(Continued)

*Primary Examiner* — Wynuel S Aquino
*Assistant Examiner* — Melissa A Headly
(74) *Attorney, Agent, or Firm* — Womble Bond Dickinson (US) LLP

(57) ABSTRACT

The present subject matter relates to a method and system for correlation analysis of performance metrics. In one embodiment, a computing system for correlation analysis of performance metrics is described. The computing system includes a processor, and a memory which is coupled to the processor. Further, the memory comprises a profiler agent, a correlation engine, and a graphics controller. The profiler agent collects the performance metrics based on execution of a target application. The correlation engine establishes correlation between the performance metrics based on a predefined parameter. The graphics controller generates a consolidated interface of the performance metrics depicting the established correlation between the performance metrics.

10 Claims, 5 Drawing Sheets

(51) Int. Cl.
*G06F 11/34* (2006.01)
*G06F 11/32* (2006.01)

(56) References Cited

U.S. PATENT DOCUMENTS

| | | | | |
|---|---|---|---|---|
| 2010/0332646 | A1* | 12/2010 | Balasubramanian | ........................ G06F 9/5016 709/224 |
| 2011/0138385 | A1* | 6/2011 | Schmelter | ........... G06F 11/3466 718/1 |
| 2013/0139130 | A1* | 5/2013 | Anjan | ................. G06F 11/3672 717/131 |
| 2013/0249917 | A1* | 9/2013 | Fanning | ................ G06T 11/206 345/440 |

OTHER PUBLICATIONS

Molto,' Elastic Memory Management of Virtualized Infrastructures for Applications with Dynamic Memory Requirements, Jun. 2013, Procedia Computer Science, 2013 International Conference on Computational Science, vol. 18, pp. 159-168 (Year: 2013).*

\* cited by examiner

CORRELATION ANALYSIS OF PERFORMANCE METRICS

TECHNICAL FIELD

The present subject matter relates, in general to performance testing of multithreaded applications and in particular to correlation analysis of performance metrics of a multithreaded application.

BACKGROUND

Multi-threading is a well known programming and execution model. In multi-threading, an application program is divided into multiple concurrent streams of execution, generally referred to as threads. Each of such threads typically includes a sequence of instructions and data to carry out a particular programming task, such as a computation task or an input/output task. Although, the threads share resources, such as CPU, memory, IO, network, but are able to execute independently.

Most of current enterprise application programs are designed by leveraging the concept of multithreading in which multiple threads generally run concurrently under different thread groups. In such cases, there are high chances that such threads could cause performance issues which might be unmanageable by manual tracking. The presence of threads in an application opens up many potential issues regarding safe access to the resources as two threads modifying the same resource might interfere with each other in inadvertent ways. For example, one thread might overwrite changes made by another thread or put the application into an unknown and potentially invalid state. This may cause the application program to slow down or even crash. Therefore, performance testing of multithread applications is critical.

BRIEF DESCRIPTION OF THE DRAWINGS

The detailed description is described with reference to the accompanying figures. In the figures, the left-most digit of a reference number identifies the figure in which the reference number first appears. The same numbers are used throughout the figures to reference like features and components. Some embodiments of systems and methods in accordance with embodiments of the present subject matter are now described, by way of example only, and with reference to the accompanying figures, in which.

DETAILED DESCRIPTION

Figure 1:
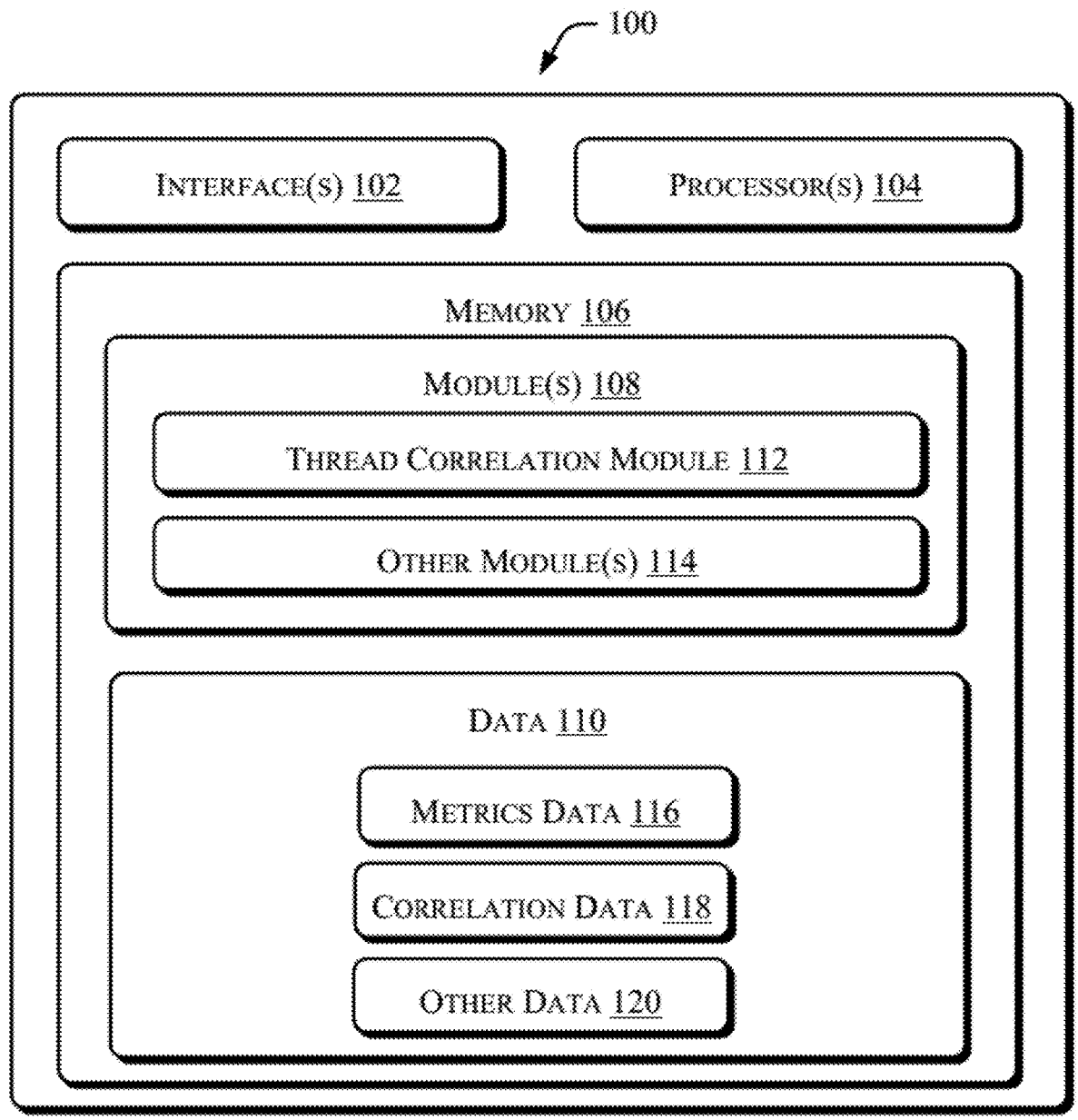
FIG. 1 illustrates a system for correlation analysis of performance metrics, according to an embodiment of the present subject matter.

The present subject matter relates to performance optimization of multithreaded applications. In this context, profiling is a form of dynamic analysis of application programs for the purpose of performance optimization and can be done using an automated tool, referred to as a profiler.

The profiler basically produces a profile of an application program from information collected during the execution of the application program. The profile typically includes behavioral characteristics of the program using which one or more portions of the application program can be identified as candidates for performance optimization. For instance, a profile might indicate that an excessive amount of memory is used in executing a particular application method. Accordingly, that particular application method can be concentrated upon, for the purpose of optimization. In other words, a profile aids in understanding of program behavior to facilitate concentration of optimization efforts.

Similarly, in multithreaded applications, thread profiling can be done to check the activity of threads in a multithreaded application, resolve deadlocks, and get detailed information about the same, for example in the form of various thread metrics. The thread profiling can be done using a thread profiler that can be used to identify bottlenecks in multithreaded applications. Thread profiling of a multithreaded application using such a conventional thread profiler requires the thread profiler to provide various thread metrics details, such as states of thread, deadlock information, and some trace information, to a user. While trying to test the performance of multithreaded applications, capturing such thread metrics alone may not be sufficient to identify and address thread related bottlenecks at times. This is because, when a thread is found to be in a wait state or a block state for a very long time or all the threads are stalled for a long time, it could be due to several other factors pertaining to application or application environment. Examples of such other factors include, but are not limited to, IO usage, network usage, application methods involved at that time, etc. Therefore, the performance related bottlenecks in the threads can be completely analyzed and optimized when all these factors are available along with some kind of interlinking with thread metrics.

Clearly, the conventional systems fail to provide any such interlinking as the conventional systems merely address thread related issues through providing either thread dumps or thread metrics at repeated time intervals. In this way, only the details of threads and deadlocks are displayed to the user. Though the thread states are displayed to the user in various formats like table, chart etc., however, the thread states do not provide details of interlinking between the threads and relevant application methods and resources like CPU, memory, IO, etc. The conventional systems thus fail to provide any interlinking of the performance metrics.

According to an implementation of the present subject matter, methods and systems for correlation analysis of performance metrics on a consolidated interface are described. In one embodiment, a variety of performance metrics are collected. The performance metrics are collected on the basis of execution of a target multithreaded application in a computing system. Further, a correlation can be established between the performance metrics based on at least one of various predefined parameters, such as timestamp. Further, a consolidated interface of the performance metrics can be generated which depicts the established correlation, i.e., interlinking between the performance metrics. Furthermore, the consolidated interface can be updated in accordance with the established correlation in order to enable user to observe the established correlation.

While the conventional methods and systems merely display various metrics to the user, the present subject matter enables a user to visualize the thread metrics with relevant correlations to the performance metrics, including but not limited to CPU, active method executions, thread details, deadlock details, count etc. The user is thus able to get end to end picture of threads, its performance, and its impact on other resources like CPU, memory, network, or IO. Furthermore, a user can detect performance issues in multithreaded applications using this consolidated interface as the consolidated interface is capable of displaying several metrics related to threads and deadlocks while highlighting the correlation among several other performance metrics like active methods from application, CPU, Memory, Network statistics etc. From these correlations, the potential thread bottlenecks can be easily detected. For example, if a deadlock is detected, using the correlation, the active methods involved in the deadlocks and the resources locked in the deadlocked threads can be easily detected, thus saving computation resources and time.

The following detail description describes methods and systems for correlation analysis of performance metrics. While aspects of the described system and method can be implemented in any number of different computing systems, environments, and/or configurations, embodiments for methods and systems for correlation analysis of performance metrics are described in the context of the following exemplary system(s) and method(s).

FIG. 1 illustrates a system 100 for correlation analysis of performance metrics, according to an embodiment of the present subject matter. Further, the system 100 can be implemented on a computing system. Examples of the computing system may include, but are not limited to, a desktop computer, a portable computer, a laptop, a handheld device, a server, and a workstation.

The system 100 includes interface(s) 102. Further, the interface(s) 102 may include a variety of software and hardware interfaces, for example, a graphical user interface (GUI) and interfaces for peripheral device(s), such as a product board, a mouse, an external memory, a display screen, and a printer. Additionally, the interface(s) 102 may enable the system 100 to communicate with other devices, such as web servers, network servers, database servers, and external repositories. The interface(s) 102 may also facilitate multiple communications within a wide variety of networks and protocol types, including wired networks, for example, LAN, cable, etc., and wireless networks, such as WLAN, cellular, or satellite. For the purpose, the interface(s) 102 may include one or more relevant ports.

The system 100 further includes processor(s) 104 coupled to a memory 106. The processor(s) 104 may be implemented as one or more microprocessors, microcomputers, microcontrollers, digital signal processors, central processing units, state machines, logic circuitries, and/or any devices that manipulate signals based on operational instructions. Among other capabilities, the processor(s) 104 may be configured to fetch and execute computer-readable instructions stored in the memory 106.

The memory 106 may include any computer-readable medium known in the art including, for example, volatile memory, such as static random access memory (SRAM), and dynamic random access memory (DRAW), and/or non-volatile memory, such as read only memory (ROM), erasable programmable ROM, flash memories, hard disks, optical disks, and magnetic tapes. Further, the memory 106 includes module(s) 108 and data 110.

The module(s) 108 include a thread correlation module 112 and other module(s) 114. The other module(s) 114 may include programs or coded instructions that supplement applications or functions performed by the system 100. The data 110, amongst other things, may serve as a repository for storing data that is processed, received, or generated as a result of user actions or the execution of the thread correlation module 112 and the other module(s) 114. The data 110 includes metrics data 116, correlation data 118, and other data 120.

In one implementation, the thread correlation module 112 is configured to collect a variety of various performance metrics, such as thread metrics, application metrics, and resource metrics from execution of a multithreaded application. In one implementation, the thread correlation module is configured to store the performance metrics in a data store, such as the metrics data 116. The thread correlation module 112 may be further configured to analyze the performance metrics and accordingly establish correlation between the performance metrics stored in the metrics data 116. In one implementation, the thread correlation module 122 is configured to store correlation information in a data store, such as the correlation data 118.

In one implementation, the thread correlation module 112 establishes the correlation based on at least one of various predefined parameters, such as timestamp. In other words, some of performance metrics may be correlated with each other based on the timestamp. In one implementation, the correlation may be established on the basis of user selection of one of the performance metrics. For example, if the user selects an item in one performance metrics, then relevant items in the other performance metrics may be automatically highlighted in response to the user selection. In one implementation, the thread correlation module 112 establishes the correlation on the basis of configuration information of the multithreaded application which may be provided by a user.

The thread correlation module 112 may be further configured to generate a consolidated interface of the performance metrics based on the correlation information stored in the correlation data 118. In one implementation, the consolidated interface includes one or more graphical objects that can be manipulated by the user to interact with the correlation interface. In this implementation, the thread correlation module 112 may be further configured to update, upon receiving a user input, the correlation interface in accordance to the correlation information. In this way, the user can analyze the performance metrics and correlation between them in order to identify performance bottlenecks in the multithreaded application.

Figure 2:
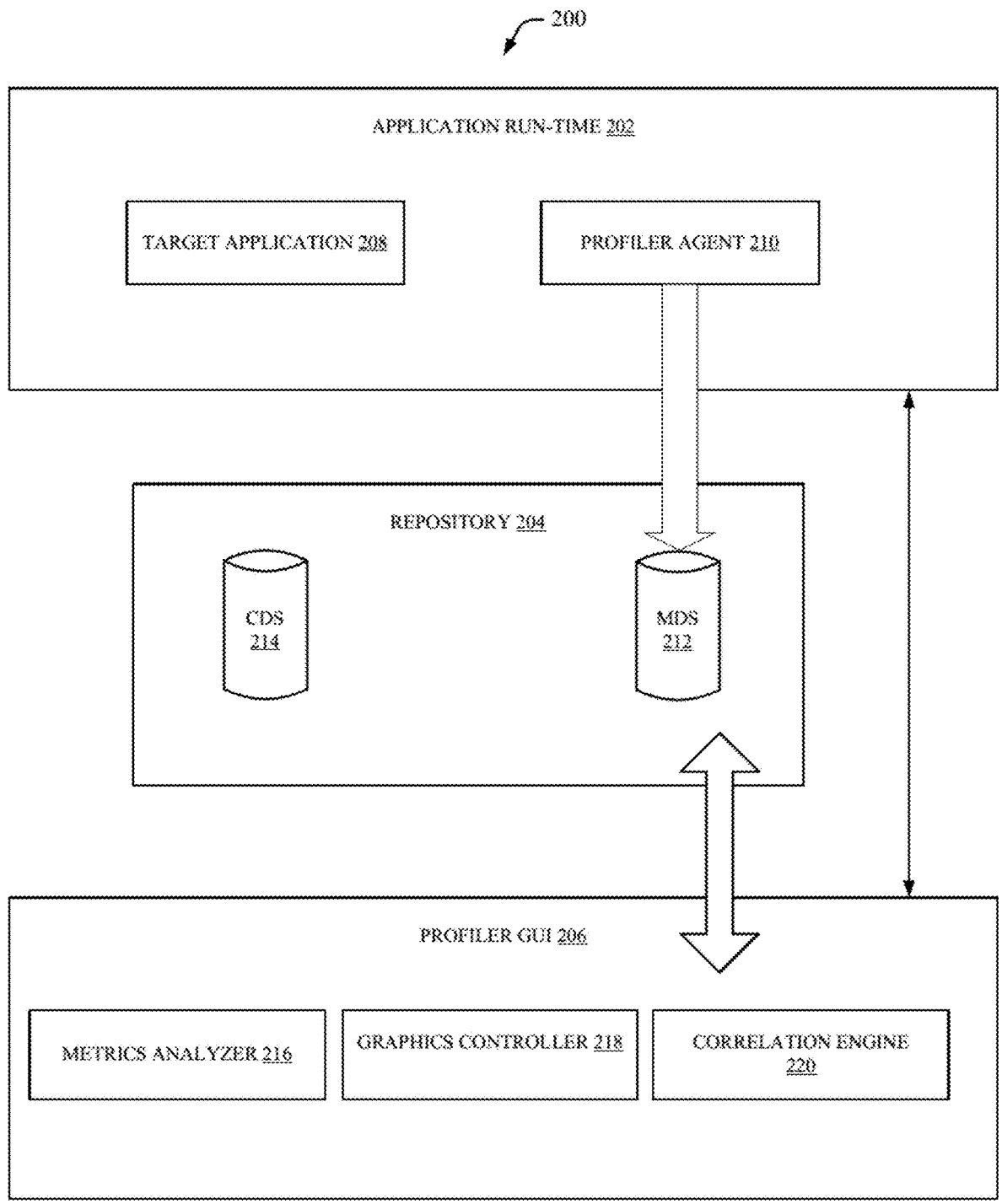
FIG. 2 illustrates exemplary system architecture of the system for correlation analysis of performance metrics, according to an embodiment of the present subject matter.

FIG. 2 illustrates exemplary system architecture 200 of a system for correlation analysis of performance metrics on a consolidated interface, such as the system 100, according to an embodiment of the present subject matter. In this embodiment, the system architecture 200 includes three main building blocks, namely application run time 202, a repository 204, and a profiler GUI 206, which may be provided, for example, in the memory 106 of the system 100.

Here, the application run-time 202 is an execution environment like Java Virtual Machine (JVM) run-time. The application run-time 202 includes a target application 208 and a profiler agent 210. The target application 208 is a multithreaded application which is being tested or profiled for performance metrics. The profiler agent 210 is the agent of a profiler which attaches itself with the application runtime 202 upon instruction. The profiler agent 210 may be communicatively coupled with the profiler GUI 206, for example to receive user commands through the profiler GUI 206 and respond to the received user commands. A thread profiler (not shown) is one of the sub-modules of the profiler agent 210 which is configured for capturing various performance metrics related to application threads, deadlocks, and other performance parameters. Example of said metrics includes application metrics, the thread metrics, and the system resources metrics. The application metrics may include details like method name, thread name, call hierarchy, time stamp, event, etc. The thread metrics include details like Thread id, Thread name, timestamp, thread state, monitor, locks, etc. The system resources metrics may include details like process id, process name, memory details, CPU details, thread details, file handles, IO usage, network usage, etc.

The repository 204 may include various data sources, such a metrics data source 212, hereinafter referred to as the MDS 212, and a configuration data source 214, hereinafter referred to as the CDS 214. The MDS 212 may be implemented as a central data source which is configured to store performance metrics captured during real-time monitoring. In one implementation, the MDS 212 may also be used for historical analysis of monitored data. Similarly, the CDS 214 may also be implanted as a central data source which is configured to store the configuration information of entire system architecture 200, including but not limited to the target application 208, the profiler agent 210, the thread profiler, the profiler GUI 206, etc. In one example, the configurations information may include methods, classes, packages, classloaders, containers, timertasks, schedulers, frameworks used in the target application 208.

The profiler GUI 206 is a graphical user interface for the end users to give inputs and view outputs. For instance, the interface(s) 102 of the system 100 may be configured to act as the profiler GUI 206. In one implementation, the profiler GUI 206 may include three major components, namely a metrics analyzer 216, a graphics controller 218, and a correlation engine 220. Of which, the metrics analyzer 216 is a module which is configured for analyzing performance metrics obtained from the MDS 212 and generate analysis data, for example in form of new performance metrics. In one implementation, the generated performance metrics are also stored in the MDS 212. The graphics controller 218 is a module configured for displaying, based on the analysis, a correlated view of the performance metrics stored in the MDS 212 to the user in the profiler GUI 206. The correlation engine 220 is a module configured for establishing correlation between various captured/generated metrics which are available in the MDS 212 based on impacted system resources, such as IO, memory, CPU, network, etc. In one implementation, the correlation is established based on at least one of various predefined parameters, such as timestamp, metrics selection, CDS configuration, and profile agent tracker. In one implementation, the correlation engine 220 establishes the correlation based on a combination of two or more of the above listed predefined parameters.

In one implementation, based on a selected timestamp, the correlations can be made in various metrics to depict corresponding details/actions on that timestamp. For example, at a given timestamp, a thread state can be correlated with CPU utilization percentage or memory utilization percentage.

In one implementation, based on user selection of metrics, corresponding drill down correlations can be made against the selected metrics. In one example, if a thread is selected, the details of the thread, its state, locks, monitors, and the like can be correlated. In another example, if a deadlock is selected, details associated with deadlock like threads, methods involved in deadlocks etc. can be correlated. In another example, if a method is selected, details associated with method execution like count, response time etc. can be correlated.

In one implementation, based on the user provided configuration information which is stored in the CDS 214, application methods can be correlated with corresponding classloaders, containers, frameworks, etc. In one implementation, the above mentioned correlations can also be performed with reference to an additional factor of desirability from user. Based on user desirability, the correlation engine can adjust to filter the correlations. For example, if user added the configuration to correlate only a subset of methods and frameworks, then the correlations are made only to desired sub-set by user. This yields not only to a better correlation, but to faster and efficient way to perform resource impact analysis in the target application 208.

In one implementation, the correlations between various performance metrics can also be derived from tracking or activity log of the profiler agent 210. Whenever an application method requests for memory to create any object, the profiler agent 210 tags that object with the application method. In such cases, the correlation engine 220 can be configured to correlate the list of objects and memory used by specific application method. Whenever an application method invokes file IO operation, network socket operations, or database calls, the same can be correlated with corresponding methods or threads.

In one implementation, the correlations explained above can be merged in multiple levels to arrive at several permutations and combinations of correlation options. This could help user in understanding the resource impact or usage of the target application 208 in a consolidated interface. For example, deadlocks can correlated with methods and methods with corresponding file IO and network socket operations. This could reveal during troubleshooting whether an actual file or network problem resulted in deadlock of the target application 208. The correlation interface may be designed in such a way so that it can be customized to mange various correlation options as per the requirement. Since correlation is performed across various performance metrics, it helps the user in assisting performance drill down analysis or resources impact analysis from a single consolidated customizable interface.

Figure 3A:
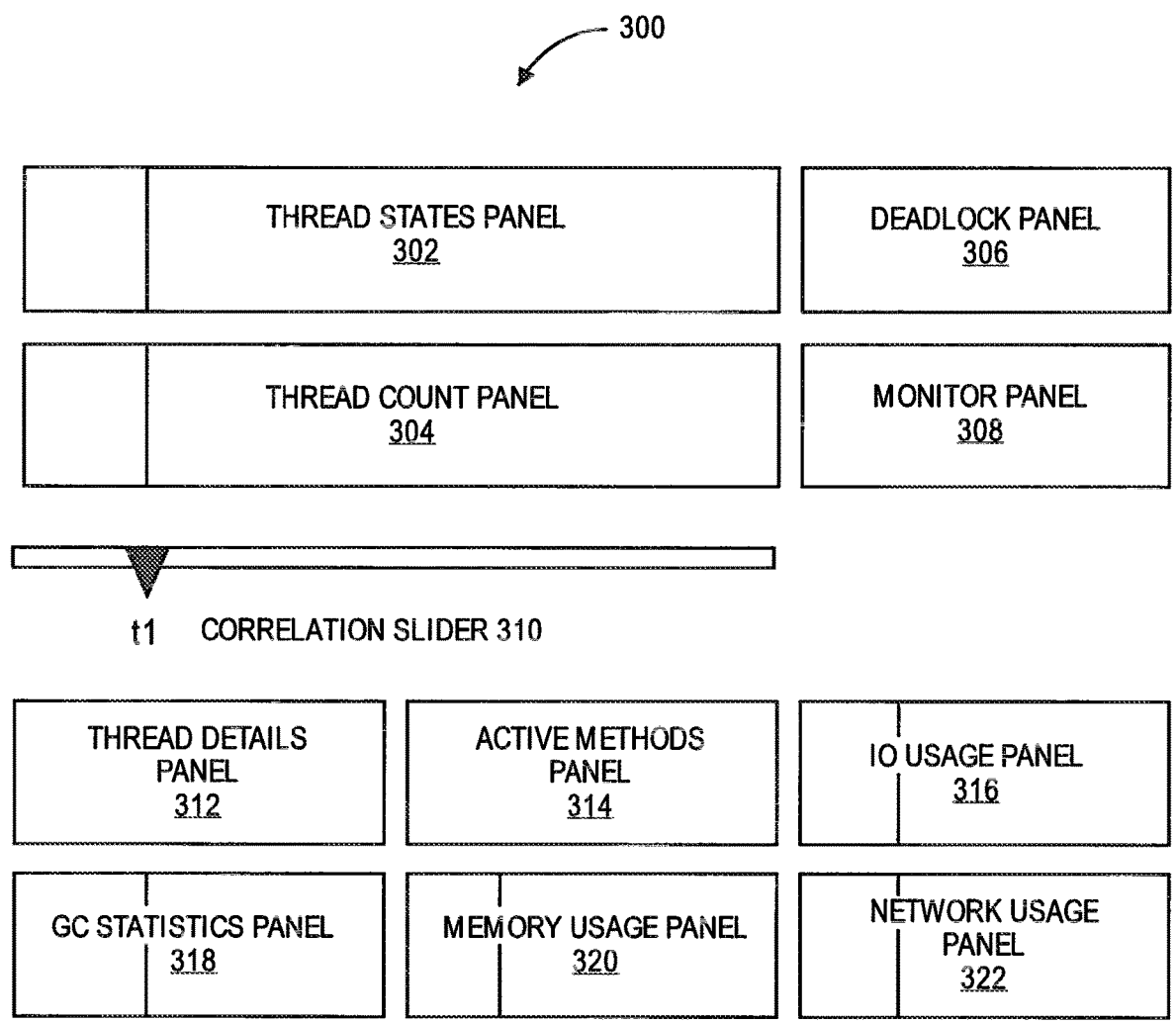
FIGS. 3a and 3b illustrate exemplary consolidated interface of correlated performance metrics, according to an embodiment of the present subject matter.

FIG. 3a depicts such a consolidated interface 300 of correlated performance metrics. The consolidated interface 300 acts as base for all the correlations and gives full picture about the target application and its environment with reference to thread usage. The consolidated interface may comprise various information panels, namely a thread States panel 302, a thread count panel 304, a deadlock panel 306, a monitor panel 308, and a correlation slider 310.

The thread states panel 302 is an information panel that lists all threads, its corresponding thread states, and state changes. In one implementation, the state changes or retention of threads can be plotted in equidistant time state chart with multi-color variants. Each variant can correspond to a specific state of the threads, such as runnable state, wait state, timed-wait state, blocked state. In one implementation, the user can select any coordinates from the plot which may be correlated to thread details, deadlock details, and active method details at the selected coordinates and corresponding panels are automatically updated in response to the user selection.

The thread count panel 304 is an information panel in which the graphical display of thread counts may be provided in a XY plot. Here, the X axis indicates timeline and the Y axis indicates the thread count. In one example, the thread count panel 304 may include three plots pertaining to total threads, live threads, and daemon threads respectively.

The deadlock Panel 306 and the monitor panel 308 are information panels in which the list of all deadlocked threads along with corresponding monitor lock name/id and the owner name of the locks can be displayed. Here, a lock (also referred to as a monitor) prevents more than one entity from accessing a shared resource.

The correlation slider 310 is a GUI object which can enables to observe correlation among various information panels. To perform correlation, the user can move the correlation slider 310 forward/backward or left/right.

In one implementation, the consolidated interface 300 may include various other information panels, such a thread details panel 312, active method panel 314, IO usage panel 316, GC statistics panel 318, memory usage panel 320, and network usage panel 322.

The thread details panel 312 is an information panel which displays the summary of the threads. To perform a correlation to this panel, any coordinate from the thread state panel 302 has to be selected. For the selected coordinate or any selected thread at a specific time interval, the details of the thread can be displayed in this panel. In one example, the details may include current thread state, name, id, wait count, block count, wait time, block time, lock monitor, etc.

The active methods panel 314 is an information panel which displays the summary, of the active methods in the application. To perform a correlation to this panel, any coordinate from thread state panel 302 has to be selected. For the selected coordinate, the list of active methods involved from the application with details like invocation count, total/average response time, etc. can be displayed. Generally, these active methods could be a reason because of which the thread could be in a particular state for a long time. For example, if application is waiting for an event to happen, that thread can be waiting state for long time.

IO Usage Panel 316 is an information panel in which IO Usage for the selected point can be highlighted. If frequent IO happens in the application, then there is a strong chance that threads may enter in wait state due to IO delays.

The GC Panel 318 is an information panel having a XY plot in which the X axis indicates timeline and the Y axis indicates garbage collection (GC) statistics. For any correlation slider position point, GC statistics, such as GC count, time spent on GC since application start, active GC on selected timestamp if any, of the application runtime can be highlighted. If any of GC operations is found on that time, then application threads could be in a stalled state.

The memory usage panel 320 is an information panel which displays heap usage, such as used memory, maximum memory, peak memory, or free memory in a heap, for entire duration as a XY plot in which the X axis indicates timeline and the Y axis indicates memory in MBs or KBs. In this panel, correlation can be performed using the correlation slider 310. For any slider position point, the heap usage is highlighted in corresponding timeline. For example, if memory usage is very high, then there is a strong chance that frequent GC calls are made which can make several application threads non-responsive.

The network usage panel 322 is a graphical panel with a XY plot in which X axis indicates timeline and Y axis indicates network statistics. For any correlation slider position point, network usage can be highlighted. In one example, the network usage may include bytes in and out, bandwidth, packets sent and received, etc. For network intensive applications, threads may be slow or in wait for long durations due to network delay or network traffic.

In one implementation, the consolidated interface 300 may include a CPU/processor usage panel (not shown) which is an information panel having a XY plot in which the X axis indicates timeline and Y axis indicates CPU/processor statistics. For any correlation slider position point, CPU/processor usage can be highlighted. Due to high CPU/processor utilization due to other processes in the system, application threads can be impacted in terms of response time.

In one implementation, the consolidated interface 300 may include a memory statistics panel (not shown) which is an information panel having a XY plot in which the X axis indicates timeline and the Y axis indicates memory statistics. If memory, such as RAM, usage of the system is high, then there are strong chances of slow response time of application because of paging delay and page faults. For any correlation slider position point, IO usage can be highlighted. In this way, the memory usage can be correlated with the IO usage because if the IO usage is high, it may not be only because of excessive IO operation by an application, but also because of the application using excessive memory. When the application uses excessive memory, the system internally starts using virtual memory which actually increases the IO usage. On a similar note, any other panel can also be highlighted based on user actions, such as movement in the correlation slider 310 or selection of any corresponding or related metrics from any panels.

In one implementation, the consolidated interface 300 can be made customizable to include custom metrics as per user requirement for an application. For this purpose, configuration information stored in the CDS 214 may be utilized. Based on the information stored in the CDS 214, the number of correlation panels, its position and internal metrics, type of information panel can be configured. Here, the type of information panels includes a panel having table, text, charts, XY plots, etc.

Figure 3B:
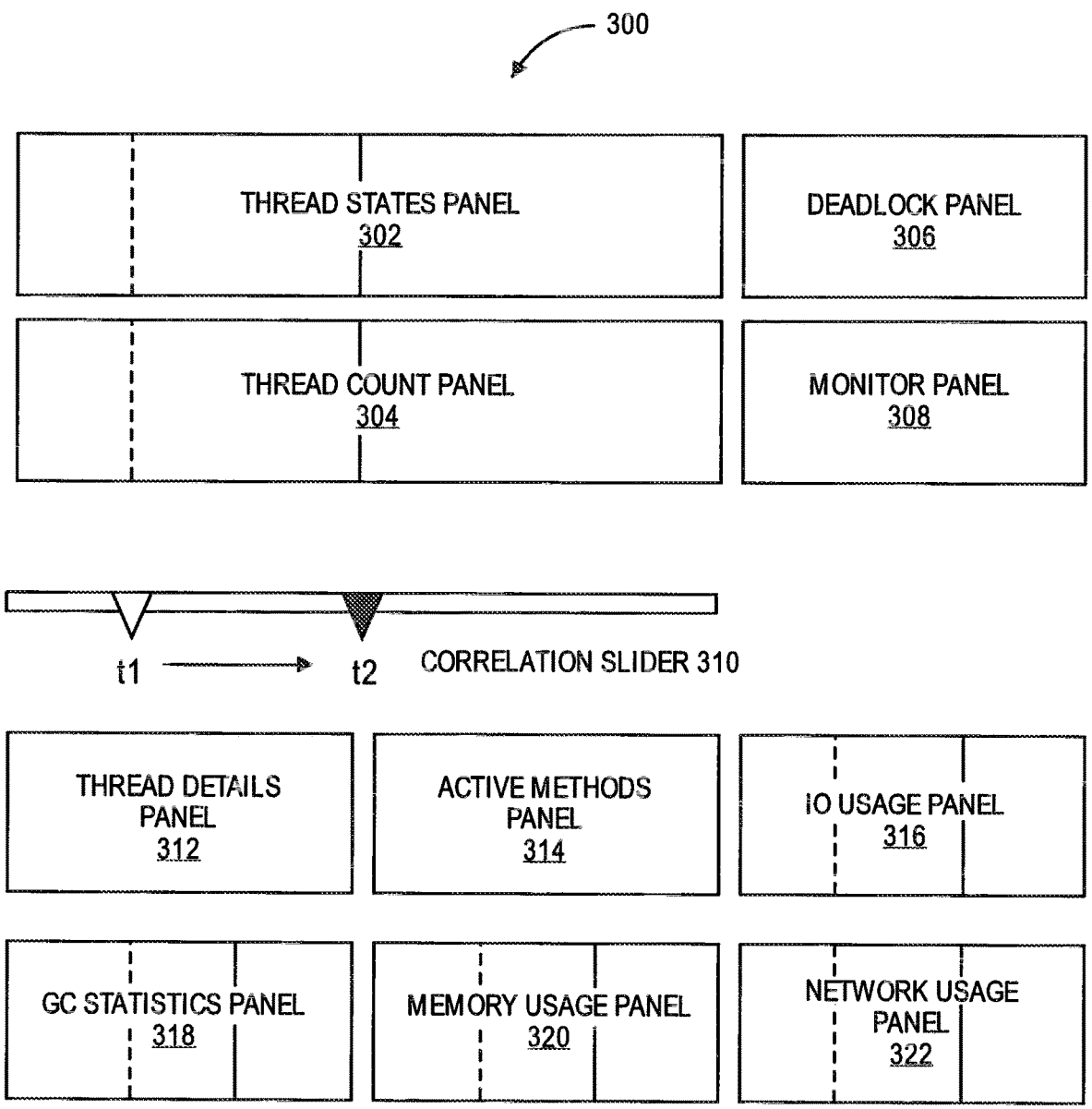

The FIG. 3b depicts a situation in which a user moves the correlation slider 310 forward from time t1 to time t2. In response to this forward movement of the correlation slider 310, the vertical solid marker in various panels automatically moves forward according to the correlation as established by the correlation engine 220. In the figure, the vertical solid marker indicates the correlation at time t2, whereas the vertical dotted marker indicates the correlation at time t1.

Figure 4:
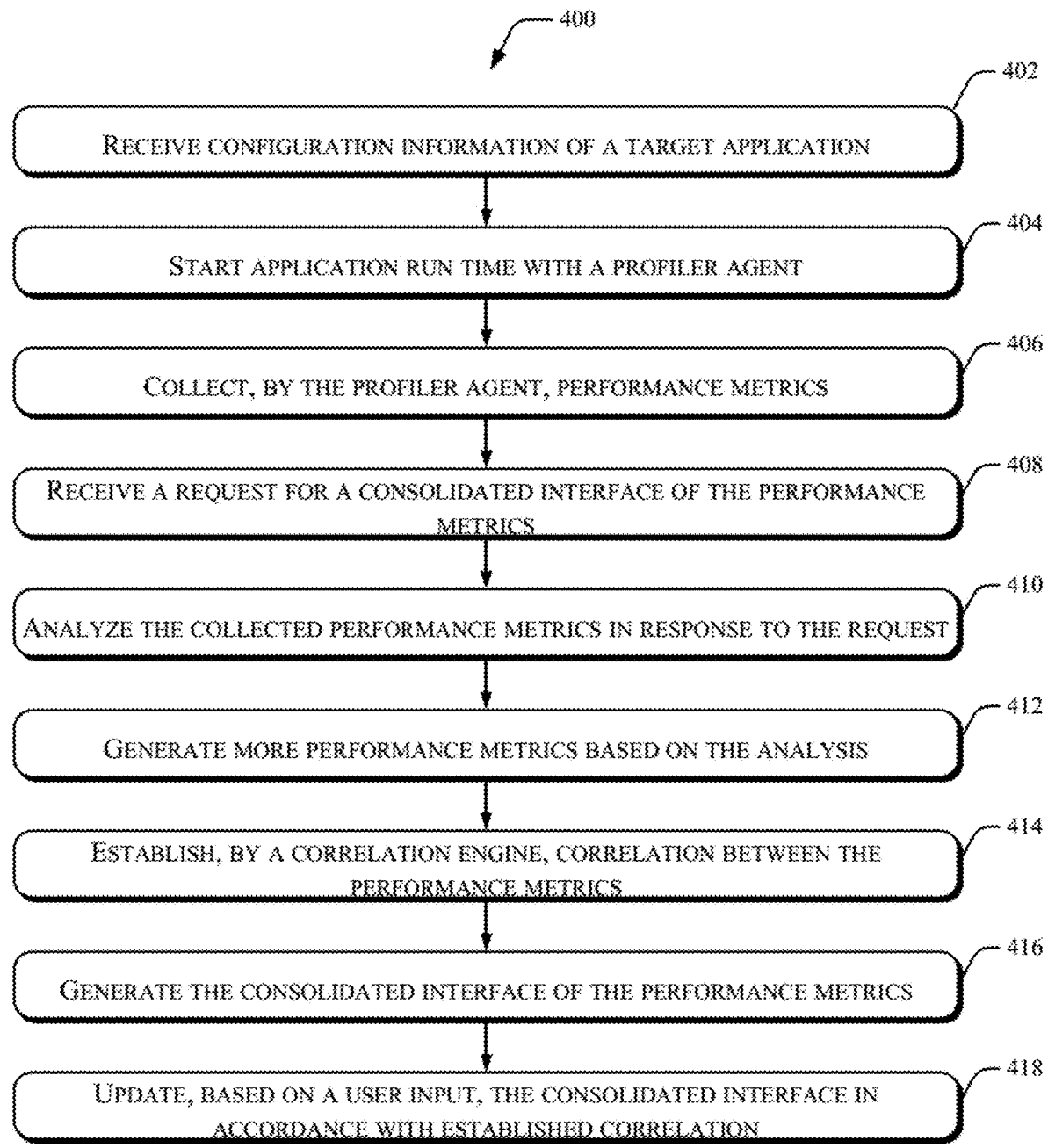
FIG. 4 illustrates a computer implemented method for correlation analysis of performance metrics, according to an embodiment of the present subject matter.

FIG. 4 illustrates a computer implemented method 400 for correlation analysis of performance metrics on a consolidated interface, according to an embodiment of the present subject matter.

The method 400 may be described in the general context of computer executable instructions. Generally, computer executable instructions can include routines, programs, objects, components, data structures, procedures, modules, functions, etc., that may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400, or alternative methods. Additionally, individual blocks may be deleted from the methods without departing from the scope of the subject matter described herein. Furthermore, the method 400 can be implemented in any suitable hardware, software, firmware, or combination thereof.

At block 402, configuration information of a target application is received. In one implementation, a user may provide the configuration information of the target application, such as the target application 208, through a GUI, such as the profiler GUI 206. Said configuration information may include, but is not limited to information pertaining to application classes, functions, databases, and the like.

At block 404, an application run-time is configured to start with a profiler agent, such as the profiler agent 210. The profiler agent may contain a communication engine and several sub-modules for each of configured performance metrics. The list of configured performance metrics includes, but is not limited to CPU usage, memory usage, heap usage, IO usage, network usage, thread usage, application response time, etc.

At block 406, the profiler agent collects various performance metrics based on the execution of the target application in a computing system, such as the system 100. In one implementation, the user can give input from the GUI to the profiler agent to start profiling the target application. For this purpose, a command can be sent to a communication engine of the profiler agent. In response, the relevant sub-modules of the profiler agent collect and store respective performance metrics at a centralized metrics data Source, such as the MDS 212.

At block 408, a request for a consolidated interface, such as the consolidated interface 300, the performance metrics is received. In one implementation, the request is made by the user through the GUI. The uses may want to analyze the consolidated interface for the end purpose of performance optimization of the target application.

At block 410, an analyzer, such as the metrics analyzer 216, analyzes the metrics data obtained from the centralized metrics data store in response to the user request for the correlation interface.

At block 412, the analyzer generates several analysis results from the metrics data obtained from the centralized metrics data store. The generated analysis results can be in form of new metrics and can be saved in a repository, such as the repository 204.

At block 414, correlation between the performance metrics is established by a correlation engine, such as the correlation engine 220, which can be initialized once the analysis is completed. In one implementation, the correlation engine is initialized as per the user configuration stored in a centralized configuration data store, such as the CDS 214. The correlation engine establishes correlation between various collected or generated metrics which are available in the centralized metrics data source, such as the MDS 212, based on at least one of various predefined parameters, such as timestamp, metrics selection, CDS configuration, and profile agent tracker.

At block 416, the correlation interface of the performance metrics is generated based on the established correlation. In one implementation, the correlation interface is displayed to the user on the GUI. The correlation interface may include various information panels each corresponding one of the performance metrics. The correlation interface may also include a slider, such as a correlation slider 310 that can be manipulated by the user to observe correlation between the performance metrics.

At block 418, the correlation interface is updated in response to a user input and in accordance with the established correlation. In one implementation, the slider can be moved backward or forward by the user on the GUI in order to see correlation between the performance metrics. In other words, the user may interact with the correlation interface through the slider. In multithreaded applications, thread performance problems can be identified and addressed only if the full picture of the application threads and its impact on various factors like response time, memory, and the like are taken into account. The correlation interface is designed to give such a view to the user.

Although embodiments for methods and systems for correlation analysis of performance metrics on a consolidated interface have been described in a language specific to structural features and/or methods, it is to be understood that the invention is not necessarily limited to the specific features or methods described. Rather, the specific features and methods are disclosed as exemplary embodiments for correlation analysis of performance metrics on a consolidated interface.

We claim:

1. A computer-implemented method for correlation of performance metrics, the method comprising:

generating a profile of a target application program in the form of performance metrics based on execution of the target application in a computing system, wherein the profile is generated upon sending a command to a communication engine of a profiler agent and storing the performance metrics corresponding to the command captured during real-time monitoring at a metric data source, wherein the profiler agent auto-attaches to an application runtime upon receiving an instruction, wherein the profiler agent is communicatively coupled with a profiler graphical user interface (GUI);

establishing correlation between the performance metrics based on a combination of two or more predefined parameters and impacted system resources;

generating and displaying a consolidated interface of the performance metrics depicting the established correlation between the performance metrics, wherein the consolidated interface comprises a plurality of information panels, and wherein the plurality of information panels comprise a thread states panel, a deadlock panel, a thread count panel, a monitor panel, a thread details panel, an active method panel, an input-output (IO) usage panel, a statistics panel, a memory usage panel, and a network usage panel, wherein the performance metrics comprise:

thread metrics, wherein the thread metrics comprise a thread id, a thread name, a timestamp, a thread state, and a monitor;

application metrics, wherein the application metrics comprise a method name, a thread name, a call hierarchy, a time stamp, and an event; and resource metrics, wherein the resource metrics comprise a process id, a process name, memory details, central processing unit (CPU) details, thread details, file handles, IO usages, and network usages; and wherein the establishing correlation between the performance metrics comprises interlinking the thread metrics with the application metrics and the resource metrics based on two or more predefined parameters selected from timestamp, metrics selection, configuration of configuration data source, and profile agent tracker, wherein the configuration data source is implanted as a central data source to store the configuration information of the computing system including the target application, the profiler agent, a thread profiler, the profiler GUI, wherein when the target application uses excess memory then the computing system internally starts using a virtual memory which increases the IO usages;

wherein the thread state is correlated with one of a CPU utilization percentage or a memory utilization percentage at a specified time stamp; and updating the consolidated interface based on a user input to allow analysis of the correlated performance metrics based on the user input, wherein when the user input indicates selection of a thread from the thread states panel, details of the thread, thread state, locks, and monitors are correlated, and state changes are plotted in an equidistant time state chart with multi-color variants, and each variant corresponds to a specific state of the thread comprising at least one of a runnable state, a wait state, a timed-wait state, and a blocked state, wherein when the user input indicates selection of a deadlock from the deadlock panel, details associated with the deadlock comprising deadlocked threads and methods involved in the deadlock are correlated, and wherein when the user input indicates selection of a method from the active method panel, details associated with the execution of the method comprising count and response time are correlated.

2. The method as claimed in claim 1, wherein the user input in one of the performance metrics is automatically reflected in other performance metrics in accordance with the established correlation.

3. The method as claimed in claim 1, further comprising: receiving configuration information of the target application from a user.

4. The method as claimed in claim 1, wherein displaying the consolidated interface of the performance metrics comprises displaying thread states, thread count, deadlock threads and corresponding monitor lock name; and enabling observation of correlation among the displayed performance metrics.

5. A computing system for correlation analysis of performance metrics, the system comprising:
a processor; and
a memory coupled to the processor, the memory comprising:
a target application program and a profiler agent to generate the performance metrics based on execution of the target application program, wherein the profile is generated upon sending a command to a communication engine of a profiler agent and storing the performance metrics corresponding to the command captured during real-time monitoring at a metric data source, wherein the profiler agent auto-attaches to an application runtime upon receiving an instruction, wherein the profiler agent is communicatively coupled with a profiler graphical user interface (GUI) included in the computing system;
a central repository comprising the metric data source and configuration data source;
a correlation engine to establish correlation between the performance metrics based on the combination of two or more predefined parameters and impacted system resources; and
a graphics controller to display the consolidated interface of the performance metrics depicting the established correlation between the performance metrics, wherein the consolidated interface comprises a plurality of information panels, and wherein the plurality of information panels comprise a thread states panel, a deadlock panel, a thread count panel, a monitor panel, a thread details panel, an active method panel, an input-output (IO) usage panel, a statistics panel, a memory usage panel, and a network usage panel, wherein the performance metrics comprise:

thread metrics, wherein the thread metrics comprise a thread id, a thread name, a timestamp, a thread state, and a monitor;

application metrics, wherein the application metrics comprise a method name, a thread name, a call hierarchy, a time stamp, and an event; and resource metrics, wherein the resource metrics comprise a process id, a process name, memory details, CPU details, thread details, file handles, IO usages, and network usages; and wherein the correlation engine establishes the correlation between the performance metrics by interlinking the thread metrics with the application metrics and the resource metrics based on two or more predefined parameters selected from timestamp, metrics selection, configuration of configuration data source, and profile agent tracker, wherein the configuration data source is implanted as a central data source to store the configuration information of a computing system architecture including the target application, the profiler agent, a thread profiler, the profiler GUI, wherein when the target application uses excess memory then the computing system internally starts using a virtual memory which increases the IO usages;

wherein the thread state is correlated with one of a CPU utilization percentage or a memory utilization percentage at a specified time stamp; and wherein the graphics controller updates the consolidated presentation based on a user input to allow analysis of the correlated performance metrics based on the user input, wherein when the user input indicates selection of a thread from the thread states panel, details of the thread, thread state, locks, and monitors are correlated, and state changes are plotted in an equidistant time state chart with multi-color variants, and each variant corresponds to a specific state of the thread comprising at least one of a runnable state, a wait state, a timed-wait state, and a blocked state, wherein when the user input indicates selection of a deadlock from the deadlock panel, details associated with the deadlock comprising deadlocked threads and methods involved in the deadlock are correlated, and wherein when the user input indicates selection of a method from the active method panel, details associated with the execution of the method comprising count and response time are correlated.

6. The system as claimed in claim 5, wherein the consolidated interface of performance metrics is displayed by the graphic controller on the information panel, the information panel comprising:
a correlation slider enabling observation of correlation among the information panels, and wherein the user input is in the form of forward or backward movement of the correlation.

7. The system as claimed in claim 5, wherein the user input in one of the performance metrics is automatically reflected in other performance metrics in accordance with the established correlation.

8. The system as claimed in claim 5, wherein the configuration information is provided by a user.

9. A non-transitory computer readable medium having computer executable instructions which when executed, implement a method for correlation of performance metrics, the method comprising:
generating a profile of a target application program in the form of performance metrics based on execution of a target application in a computing system, wherein the profile is generated upon sending a command to a communication engine of a profiler agent and storing the performance metrics corresponding to the command captured during real-time monitoring at a metric data source, wherein the profiler agent auto-attaches to an application runtime upon receiving an instruction, wherein the profiler agent is communicatively coupled with a profiler graphical user interface (GUI);

establishing correlation between the performance metrics based on combination of two or more predefined parameters and impacted system resources; and generating and displaying a consolidated presentation of the performance metrics depicting the established correlation between the performance metrics, wherein the consolidated interface comprises a plurality of information panels, and wherein the plurality of information panels comprise a thread states panel, a deadlock panel, a thread count panel, a monitor panel, a thread details panel, an active method panel, an input-output (IO) usage panel, a statistics panel, a memory usage panel, and a network usage panel, wherein the performance metrics comprise:

thread metrics, wherein the thread metrics comprise a thread id, a thread name, a timestamp, a thread state, and a monitor;

application metrics, wherein the application metrics comprise a method name, a thread name, a call hierarchy, a time stamp, and an event; and resource metrics, wherein the resource metrics comprise a process id, a process name, memory details, CPU details, thread details, file handles, IO usages, and network usages; and wherein the establishing correlation between the performance metrics comprises interlinking the thread metrics with the application metrics and the resource metrics based on two or more predefined parameters selected from timestamp, metrics selection, configuration of configuration data source, and profile agent tracker, wherein the configuration data source is implanted as a central data source to store the configuration information of the computing system including the target application, the profiler agent, a thread profiler, the profiler GUI, wherein when the target application uses excess memory then the computing system internally starts using a virtual memory which increases the IO usages;

wherein the thread state is correlated with one of a CPU utilization percentage or a memory utilization percentage at a specified time stamp; and updating the consolidated presentation based on a user input to allow analysis of the correlated performance metrics based on the user input, wherein when the user input indicates selection of a thread from the thread states panel, details of the thread, thread state, locks, and monitors are correlated, and state changes are plotted in an equidistant time state chart with multi-color variants, and each variant corresponds to a specific state of the thread comprising at least one of a runnable state, a wait state, a timed-wait state, and a blocked state, wherein when the user input indicates selection of a deadlock from the deadlock panel, details associated with the deadlock comprising deadlocked threads and methods involved in the deadlock are correlated, and wherein when the user input indicates selection of a method from the active method panel, details associated with the execution of the method comprising count and response time are correlated.

10. The non-transitory computer readable medium as claimed in claim 9, wherein displaying the consolidated interface comprises presentation of the performance metrics comprising displaying thread states, thread count, deadlock threads and corresponding monitor lock name, and enabling observation of correlation among the displayed performance metrics.

* * * * *